(12) United States Patent
Huang et al.

(10) Patent No.: US 11,614,585 B2
(45) Date of Patent: Mar. 28, 2023

(54) PLANAR OPTICAL WAVEGUIDE BASED ON TWO-DIMENSIONAL OPTICAL GRATING

(71) Applicant: Shanghai North Ocean Photonics Co., Ltd., Shanghai (CN)

(72) Inventors: He Huang, Shanghai (CN); Tao Lin, Shanghai (CN); Xinye Lou, Shanghai (CN)

(*) Notice: Subject to any disclaimer, the term of this patent is extended or adjusted under 35 U.S.C. 154(b) by 0 days.

(21) Appl. No.: 17/092,964

(22) Filed: Nov. 9, 2020

(65) Prior Publication Data
US 2021/0191038 A1    Jun. 24, 2021

Related U.S. Application Data

(63) Continuation of application No. 16/726,815, filed on Dec. 24, 2019, now Pat. No. 10,895,685.

(51) Int. Cl.
  *G02B 6/124*   (2006.01)
  *G02B 27/00*   (2006.01)
  *G02B 27/01*   (2006.01)

(52) U.S. Cl.
  CPC ......... *G02B 6/124* (2013.01); *G02B 27/0081* (2013.01); *G02B 27/0101* (2013.01); *G02B 2027/0125* (2013.01)

(58) Field of Classification Search
  CPC .......... G02B 6/124; G02B 6/00; G02B 6/005; G02B 6/0065; G02B 27/0081; G02B 27/0101; G02B 27/0172; G02B 2027/0125; G02B 2027/0178
  See application file for complete search history.

(56) References Cited

U.S. PATENT DOCUMENTS

| | | | | |
|---|---|---|---|---|
| 4,011,574 A | * | 3/1977 | Wang | H01L 39/223 257/618 |
| 5,719,839 A | * | 2/1998 | Naito | G11B 20/1879 |
| 7,118,710 B2 | * | 10/2006 | Cunningham | B01L 3/5085 422/82.11 |
| 7,142,364 B2 | * | 11/2006 | Suh | G02B 6/1225 385/27 |
| 10,983,340 B2 | * | 4/2021 | Popovich | G02B 6/00 |
| 11,194,086 B2 | * | 12/2021 | Fattal | G02B 30/33 |
| 2004/0038307 A1 | * | 2/2004 | Lee | C12Q 1/48 435/7.1 |
| 2009/0273779 A1 | * | 11/2009 | Baumberg | G01N 21/658 204/192.12 |
| 2017/0059879 A1 | * | 3/2017 | Vallius | G02B 27/4205 |
| 2017/0090096 A1 | * | 3/2017 | Fattal | G02B 6/0018 |
| 2017/0371090 A1 | * | 12/2017 | Fattal | G02B 6/0035 |
| 2018/0011237 A1 | * | 1/2018 | Fattal | G02B 30/33 |

(Continued)

*Primary Examiner* — Andrew Jordan
(74) *Attorney, Agent, or Firm* — Raymond Y. Chan; Daivd and Raymond Patent Firm

(57) ABSTRACT

A planar optical waveguide based on two-dimensional grating includes an optical waveguide substrate which is a transparent plane-parallel plate, and a functional grating element which includes a two-dimensional grating having two grating directions with an angle of 60° in between. The two-dimensional grating is either protruded or recessed into the top surface of the optical waveguide substrate. The output image from a micro-projector can enter the optical waveguide and then gets projected to cover the entire area of the functional grating element, enabling a human eye to view the output image across a large eye-box.

8 Claims, 5 Drawing Sheets

(56) References Cited

U.S. PATENT DOCUMENTS

| | | | |
|---|---|---|---|
| 2018/0210205 A1* | 7/2018 | Grey | G02B 27/4272 |
| 2019/0041634 A1* | 2/2019 | Popovich | G02B 27/017 |
| 2021/0033794 A1* | 2/2021 | Puckett | G02B 6/136 |
| 2021/0109273 A1* | 4/2021 | Jiang | G02B 27/4272 |
| 2021/0132281 A1* | 5/2021 | Fattal | G02B 6/0035 |
| 2021/0149208 A1* | 5/2021 | Putilin | G02B 27/0081 |
| 2021/0223461 A1* | 7/2021 | Ma | G02B 27/0172 |
| 2021/0271013 A1* | 9/2021 | Fattal | G02B 6/34 |
| 2022/0043198 A1* | 2/2022 | Fattal | G02B 27/4205 |
| 2022/0050232 A1* | 2/2022 | Schultz | G02B 27/0081 |

\* cited by examiner

PLANAR OPTICAL WAVEGUIDE BASED ON TWO-DIMENSIONAL OPTICAL GRATING

CROSS REFERENCE OF RELATED APPLICATION

This application is a Continuation application that claims the benefit of priority under 35U.S.C. § 120 to a non-provisional application, application Ser. No. 16/726,815, filed Dec. 24, 2019, which is a non-provisional application that claims priority under 35U.S.C. § 119 to China application number CN201811597280.3, filed on Dec. 26, 2018, which are incorporated herewith by references in their entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the technical field of augmented reality, and more particularly to a planar optical waveguide based on two-dimensional optical grating.

Description of Related Arts

The augmented reality technology, which is a new technology that integrates real world information and virtual world information "seamlessly", simulates physical information that is difficult to experience in a certain time and space of the real world through computerized simulation, and then applies the simulated virtual information to the real world to provide information which is integrated with the real world information and the virtual word information and is perceivable by human eyes, so as to achieve a sensory experience that transcends reality, provides an interactive experience of a real environment where virtual objects reside in the real world in a same screen or space in a real time manner.

The augmented reality technology not only has a wide range of applications in applications similar to virtual reality technology, such as research and development of cutting-edge weapons and aircraft, data model visualization, virtual training, virtual entertainment and art, but also has many obvious advantages than virtual reality technology in the fields of medical research and anatomical training, precision instrument manufacturing and maintenance, military aircraft navigation, engineering design and remote robot control because of its characteristics of augmenting rather than replacing the real world.

One established solution for optical see-through augmented reality display comprises a free-form prism with a compensating element for distortion correction for the real-world channel. Since the free-form prism cannot be too thin due to its optical power requirement, the form factor of this solution is not compact enough for an ideal near-eye glass-like augmented reality display.

Another solution for optical see-through augmented reality display adopts a planar optical waveguide which makes use of total internal reflection to transport light output from a projector, and multiple reflective surfaces or gratings to gradually send light out of the waveguide to achieve exit pupil expansion and thus effectively reduce the thickness of the optical system. In these types of conventional planar optical waveguides, the optical components for image in-coupling, exit pupil expansion, and image out-coupling needs to be designed and manufactured separately, and therefore the manufacturability being low and manufacturing cost being high are two major drawbacks for this type of conventional planar optical waveguides.

SUMMARY OF THE PRESENT INVENTION

The invention is advantageous in that it provides a planar optical waveguide based on two-dimensional grating with an integrated optical configuration for in-coupling, exit pupil expansion and out-coupling. Because of these three individual functionalities being integrated into one monolithic structure, the optical waveguide of the present invention is easy to manufacture, as well as flexible and convenient to use.

Another advantage of the present invention is to provide a planar optical waveguide based on two-dimensional grating comprising an optical waveguide substrate and a functional grating element, wherein the substrate of the planar optical waveguide is a transparent plane-parallel plate, wherein the functional grating element is a two-dimensional grating with a fixed period and an angle between two grating directions being 60°, wherein the output light of a micro-projector can enter the optical waveguide through any area of the functional grating element and thus giving a tremendous in-coupling flexibility, and wherein the total internal reflected light can be projected out of the substrate from any area of the functional grating element and thus giving a tremendous out-coupling flexibility for user' eyes to view the output image.

Another advantage of the present invention is to provide a planar optical waveguide based on two-dimensional grating, wherein the present invention can realize in-coupling, exit pupil expansion and out-coupling of the output light projected from the micro-projector through a two-dimensional grating, so as to effectively reduce the alignment tolerance between the optical waveguide and the micro-projector, expand the visible area of the optical waveguide, and effectively reduce manufacturing cost.

Another advantage of the present invention is to provide a planar optical waveguide based on two-dimensional grating, wherein the depths and shapes of a plurality of grating members in different areas of the two-dimensional grating can be modulated, so as to improve the intensity uniformity of the out-coupled image.

Another advantage of the present invention is to provide a planar optical waveguide based on two-dimensional grating, wherein the grating is a monolithic structure and thus suitable for mass-production as well as for application adaption.

Additional advantages and features of the invention will become apparent from the description which follows, and may be realized by means of the instrumentalities and combinations particularly pointing out in the appended claims.

According to the present invention, the foregoing and other objects and advantages are attained by a planar optical waveguide based on two-dimensional grating, wherein the planar optical waveguide comprises an optical waveguide substrate which is a transparent plane-parallel plate, and a functional grating element which is a two-dimensional grating having an angle of 60° between two grating directions. The two-dimensional grating can be protruded from the top surface of the optical waveguide substrate, or be etched in as a groove at the top of the optical waveguide substrate.

The transparent plane-parallel waveguide substrate is a flat plate made of optical material that transmits visible spectrum. The top surface of the waveguide substrate is parallel to the bottom.

When the light emitted by a micro-projector is incident onto an arbitrary area of the functional grating element, multiple diffraction orders generated by the two-dimensional grating then enter the plane-parallel waveguide along multiple directions, and propagate inside the waveguide by means of total internal reflection. Each time the light of multiple orders encounter the functional grating element, they get diffracted again. A part of the light will be diffracted and coupled out of the waveguide and enter human eye, and the other portion will continue propagating inside the substrate. Through various numbers of diffractions, light are coupled out of the planar optical waveguide at various positions that cover the entire functional area of grating, and as a result, the human eye can observe a complete image across the entire functional area of grating.

Preferably, the refractive index of the plane-parallel waveguide substrate is in the range of 1.4-2.2, and the thickness thereof is in the range of 0.3-2.5 mm. Currently, the refractive index of the off-the-shelf optical materials suitable for AR waveguides is generally within this range. In principle, increasing the refractive index of the substrate helps to enlarge the field-of-view of the present invention, and therefore is generally preferable.

Preferably, the period of the two-dimensional grating is in the range of 200-700 nm.

Preferably, each of the plurality of grating members of the two-dimensional grating is a cylindrical or a diamond column, wherein its bottom cross section is preferred to have either a cylindrical or a diamond shape. Not limited to the above two structural types, each of the plurality of grating members of the two-dimensional grating can also have other suitable shapes.

Preferably, the diameter of the cylindrical column or side length of the diamond column is in the range of 50-650 nm, and the height or depth thereof is in the range of 80-650 nm.

Preferably, the in-coupling position is fixed at a certain location over the functional grating element. The intensity of light propagating inside the optical waveguide gradually decreases along with continuous out-coupling by the two-dimensional grating, and thus the brightness of the output image gradually decreases along the direction of exit pupil expansion if the grating structure is non-variant. In order to solve the above problem, the column depths or diameters of the plurality of grating members of the two-dimensional grating in different areas are controlled and modulated so that the brightness of the output image across the grating area is relatively uniform. In order to control the uniformity of the output image, the in-coupling area is preferred to be fixed at a certain position over the functional grating element. Alternatively, if the requirement on image uniformity is not high, it might not be necessary to modulate depth or shape, and then the image can be coupled at any location over the grating area, i.e. there is no need to specifically set an in-coupling position.

Furthermore, the diameter or side length of the in-coupling grating structure is in the range of 200-650 nm, and the height or depth is in the range of 200-650 nm.

Preferably, the diameter or side length of the grating structure located at the in-coupling position are greater than those of the grating structure located at the out-coupling positions. The height or depth of the grating structure located at the in-coupling position are greater than those of the grating structure located at the out-coupling positions.

Furthermore, the diameter or side length of the grating structure increases with the distance of the out-coupling position from the in-coupling location.

Preferably, the height or depth of the grating structure increases with the distance of the out-coupling position from the in-coupling location.

The depth and shape of the two-dimensional grating are preferred to be modulated so that the uniformity of the light intensity of the out-coupled image across the grating area is enhanced.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
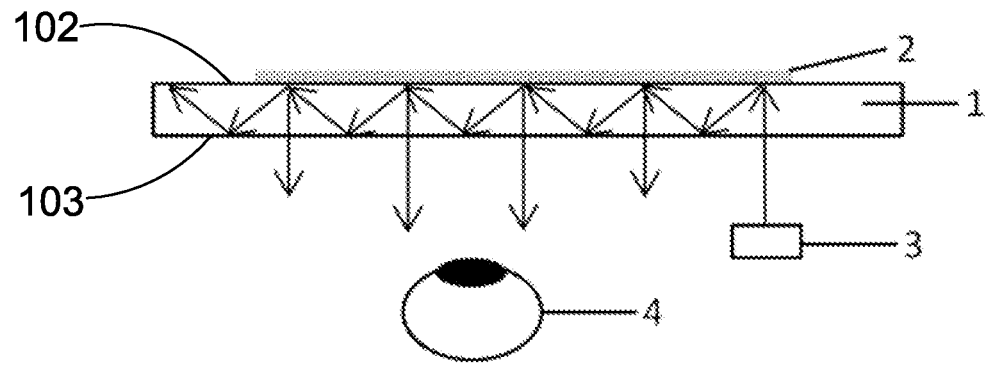
FIG. 1 is a schematic view of a planar optical waveguide based on two-dimensional grating according to a first preferred embodiment of the present invention.
Figure 2:
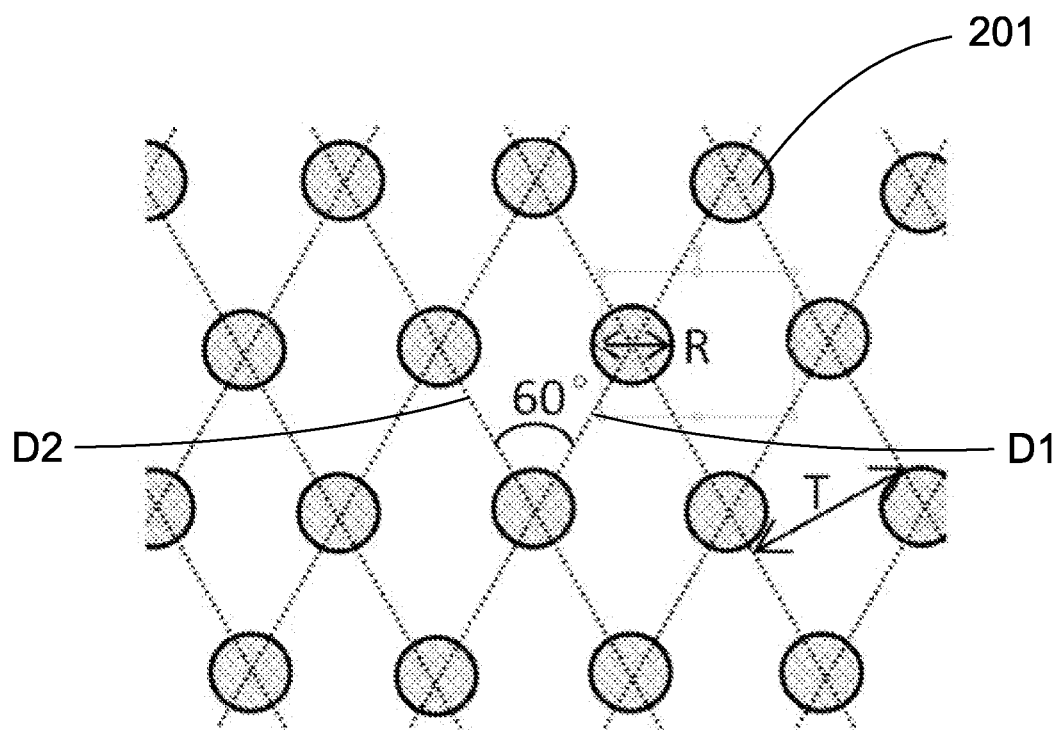
FIG. 2 is a top-down view illustrating the planar optical waveguide based on two-dimensional grating according to the above first preferred embodiment of the present invention, wherein each of the grating member of the two-dimensional grating is a cylindrical column.

Referring to FIG. 1 and FIG. 2, a planar optical waveguide based on a two-dimensional grating according to a first preferred embodiment of the present invention includes an optical waveguide substrate 1 and a functional grating element 2.

The optical waveguide substrate 1 is a transparent plane-parallel plate which has two flat surfaces enclosing a volume of an optical material that transmits visible spectrum. The top surface 102 and the bottom surface 103 of the waveguide substrate are parallel. The thickness of the waveguide substrate is in the range of 0.3-2.5 mm, and the refractive index of the waveguide material is in the range of 1.4-2.2. Referring to FIG. 2, the functional grating element 2 is a two-dimensional grating with two grating directions D1 and D2 having an angle of 60° in between. The grating period T is in the range of 200-700 nm. The grating can be modulated in depth and shape in selected areas of the waveguide. The two-dimensional grating comprises a plurality of grating members 201 arranged in an array to define the two grating directions D1 and D2. FIG. 2 illustrates a case in which each grating member is cylindrical. As shown in FIGS. 6, 7, 8, and 9, grating member 201 of the two-dimensional grating may also have other shapes.

Figures 3, 4:
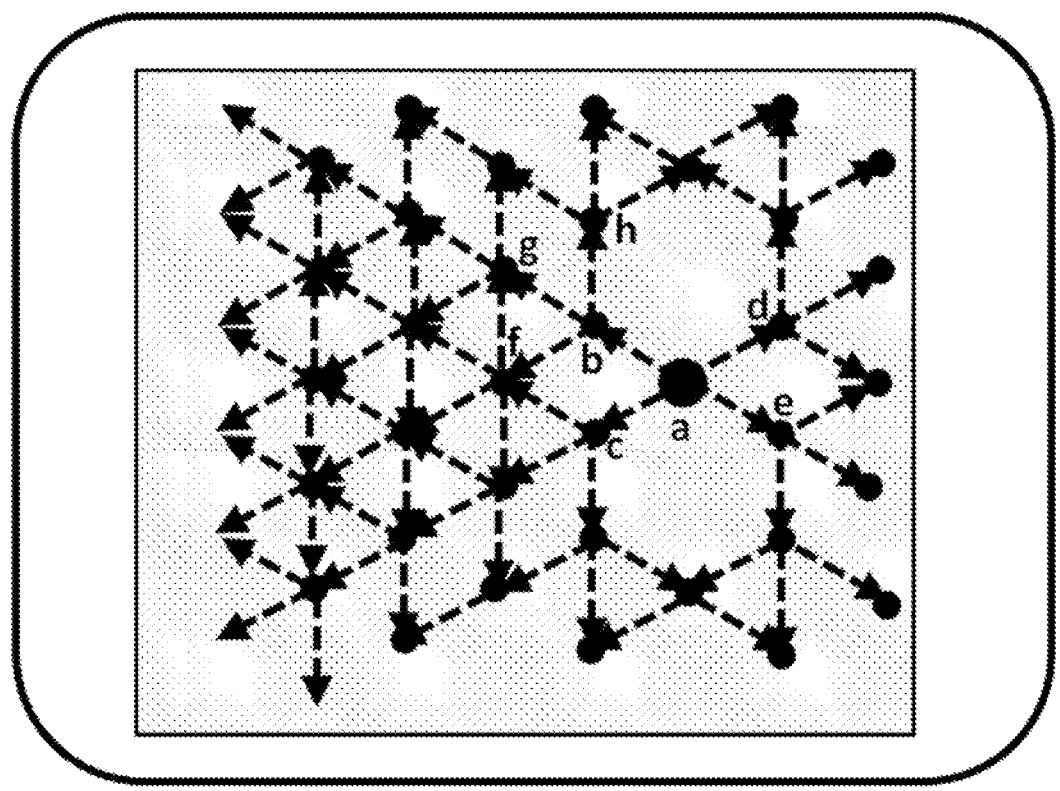
FIG. 3 is a top-down view illustrating light propagation inside the planar optical waveguide based on two-dimensional grating according to the above first preferred embodiment of the present invention.
FIG. 4 is a schematic view illustrating the layout of operation unit of the planar optical waveguide based on two-dimensional grating according to the above first preferred embodiment of the present invention.

Referring to FIG. 3, after the output image of the micro-projector 3 is projected onto any functional area of the grating, light is diffracted by the grating to generate four diffraction orders—b, c, d, and e—that are respectively propagating along four directions inside the plane-parallel waveguide. The incidence angles of the four beams on the waveguide surfaces are all greater than the critical angle required for total internal reflection, ensuring that the beams can propagate inside the plane-parallel waveguide without loss. When the beams of b, c, d and e are incident upon the functional grating element again, a portion of the light will be diffracted and coupled out of the plane-parallel waveguide, and the remaining portion of the light will be diffracted by the two-dimensional grating into three diffraction orders which keep propagating inside the waveguide substrate through total internal reflection. For instance, light b will be diffracted into orders f, g, and h, all three of which continue to propagate inside the planar optical waveguide. In this way, light can eventually be coupled out and the out-coupling footprint covers the entire functional grating area, and as a result the human eye 4 can see a complete and continuous image across a large eye-box.

Figure 5:
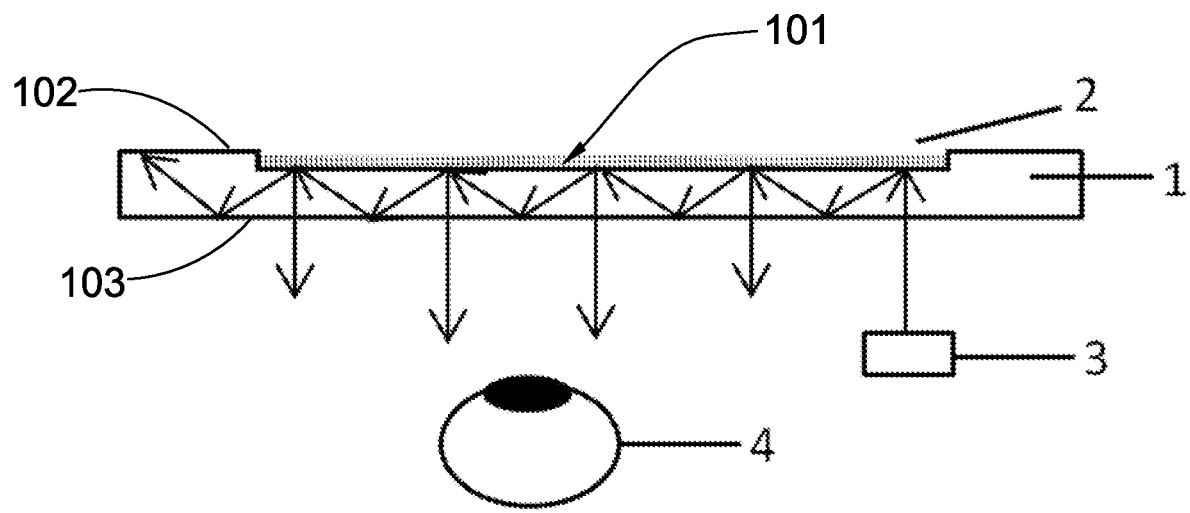
FIG. 5 is a schematic view of a planar optical waveguide based on two-dimensional grating according to a second preferred embodiment of the present invention.
Figure 6:
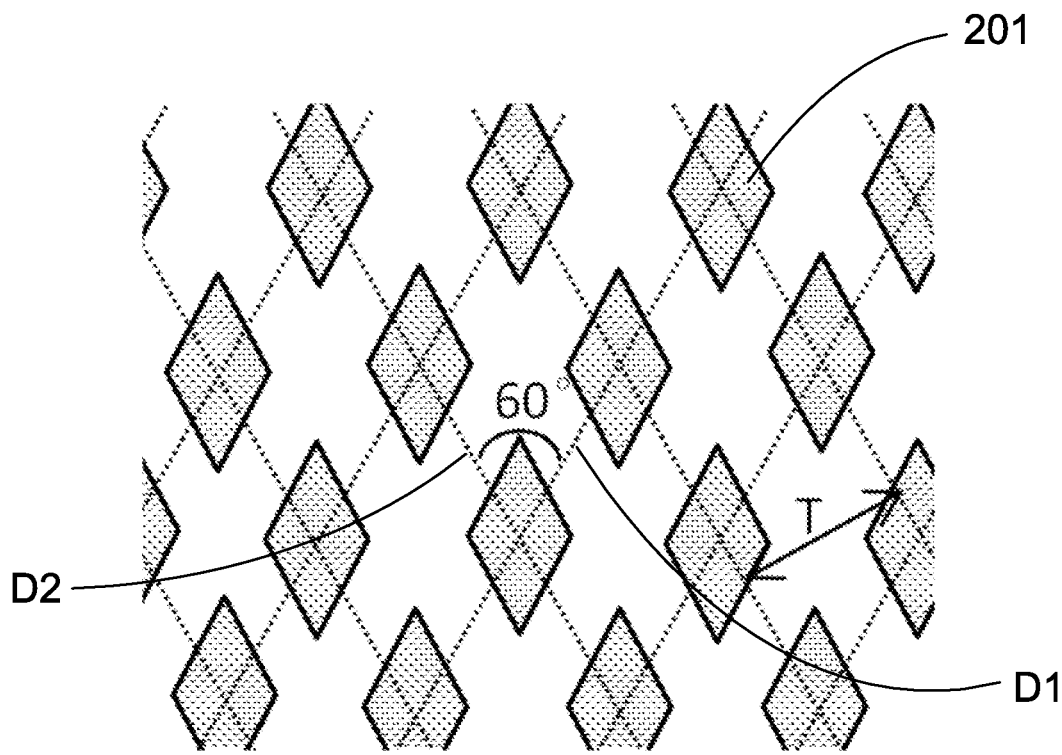
FIG. 6 is a top-down view illustrating the planar optical waveguide based on two-dimensional grating according to the above first and second preferred embodiments of the present invention, wherein each of the grating member of the two-dimensional grating is a diamond column where its bottom cross section has a diamond shape.
Figure 7:
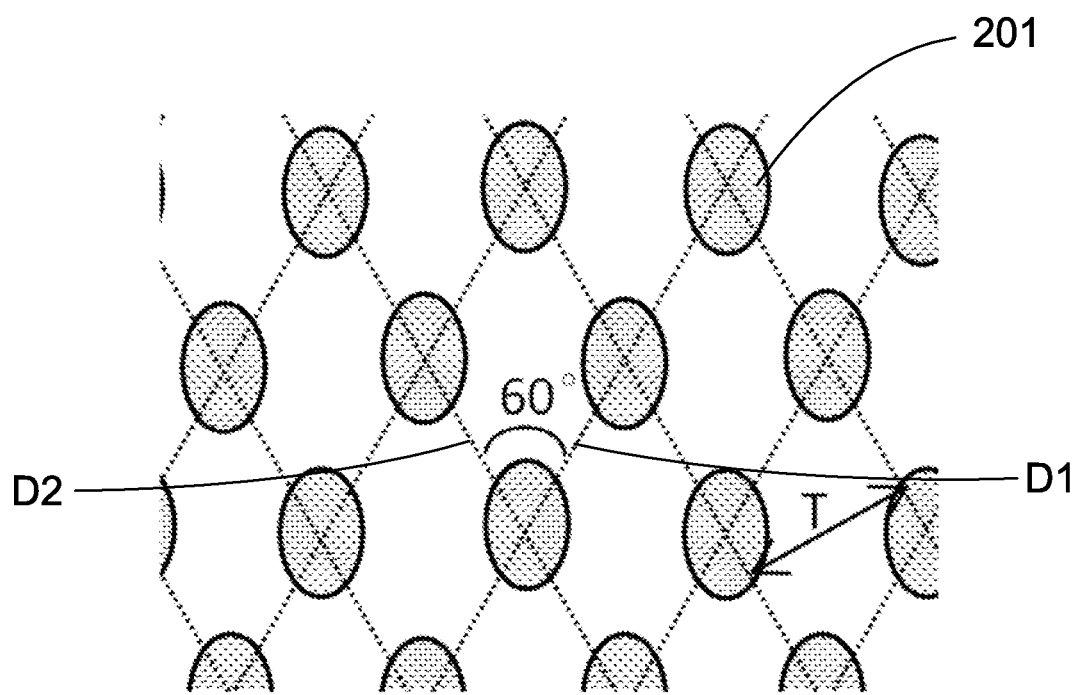
FIG. 7 is a top-down view illustrating the planar optical waveguide based on two-dimensional grating according to the above first and second preferred embodiments of the present invention, wherein each of the grating member of the two-dimensional grating is an elliptical column.
Figure 8:
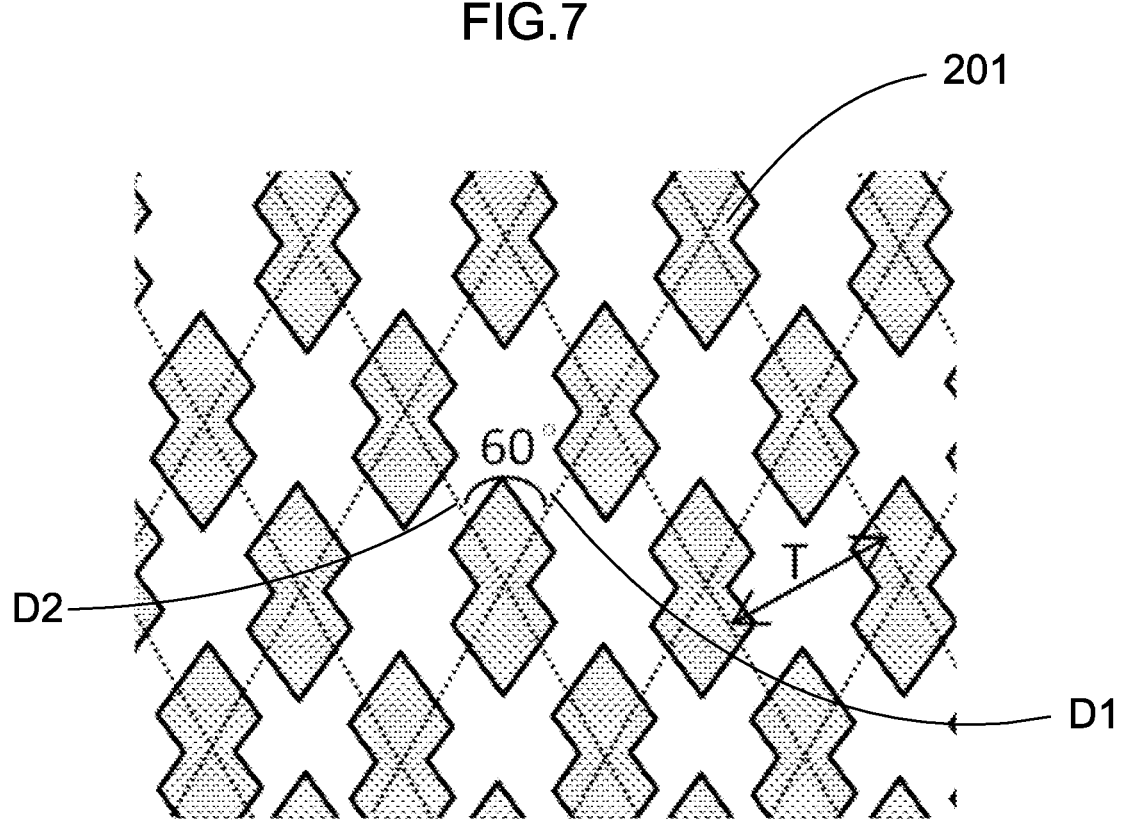
FIG. 8 is a top-down view illustrating the planar optical waveguide based on two-dimensional grating according to the above first and second preferred embodiments of the present invention, wherein each of the grating member of the two-dimensional grating is a column where its bottom cross section has a side-etched diamond shape.
Figure 9:
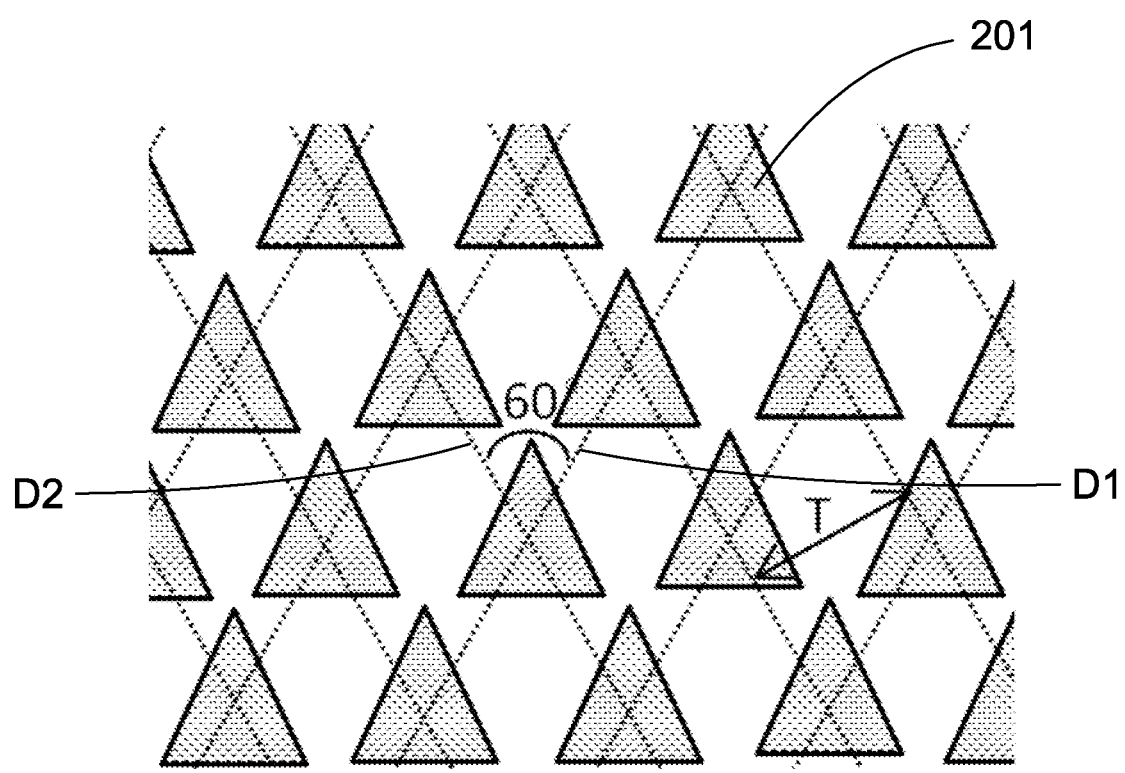
FIG. 9 is a top-down view illustrating the planar optical waveguide based on two-dimensional grating according to the above first and second preferred embodiments of the present invention, wherein each of the grating member of the two-dimensional grating is a triangular column.

The two-dimensional grating in FIG. 1 is protruded from the top surface 102 of the plane-parallel waveguide. Referring to FIG. 5, the two-dimensional grating of the present invention may also be recessed into the top surface of the waveguide substrate 1.

Example 1

As shown in FIGS. 1 and 2, the planar optical waveguide based on the two-dimensional grating of this example of the present invention includes an optical waveguide substrate 1 and a functional grating element 2.

In this example, the optical waveguide substrate 1 is a plane-parallel glass plate with top surface 102 and bottom surface 103 being in parallel with each other. The thickness of the substrate is 0.5 mm. The refractive index of the substrate is 1.5.

A two-dimensional grating, which comprises a plurality of grating members 201 embodied as cylindrical columns, with an angle of 60° between the two grating directions, a period T of 360 nm, a column diameter R of 100 nm, and a depth of 150 nm, is formed on the surface of the plane-parallel glass plate (optical waveguide substrate 1) to work as the functional structure.

The optical waveguide is divided into 30 areas as shown in FIG. 4 with A to E along the vertical direction and 1 to 6 along the horizontal direction. The image projected out from the micro-projector 3 enters the optical waveguide through C5, and the image intensity is measured in the remaining areas. The normalized intensity results are shown in table 1.

TABLE 1

| Normalized image intensity of Example 1 | | | | | |
|---|---|---|---|---|---|
| | 1 | 2 | 3 | 4 | 5 | 6 |
| A | 0.5 | 0.6 | 0.7 | 0.8 | 0.7 | 0.8 |
| B | 0.6 | 0.65 | 0.75 | 1 | 0.8 | 1 |
| C | 0.65 | 0.7 | 0.8 | 0.9 | In-coupling | 0.9 |
| D | 0.6 | 0.65 | 0.75 | 1 | 0.8 | 1 |
| E | 0.5 | 0.6 | 0.7 | 0.8 | 0.7 | 0.8 |

Example 2

As shown in FIGS. 1 and 2, the planar optical waveguide based on the two-dimensional grating of this example of the present invention includes an optical waveguide substrate 1 and a functional grating element 2.

In this example, the optical waveguide substrate 1 is a plane-parallel glass plate with top surface 102 and bottom surface 103 being in parallel with each other. The thickness of the substrate is 1.9 mm. The refractive index of the substrate is 1.8.

A two-dimensional grating, which comprises a plurality of grating members 201 embodied as diamond columns whose bottom cross section has a diamond shape, with an angle of 60° between the two grating directions, a period T of 450 nm, a side length of 200 nm, and a depth of 250 nm, is formed on the surface of the plane-parallel glass plate (optical waveguide substrate 1) to work as the functional structure.

The optical waveguide is divided into 30 areas with A to E along the vertical direction and 1 to 6 along the horizontal direction. The image projected out from the micro-projector 3 enters the optical waveguide through C4, and the image intensity is measured in the remaining areas. The normalized intensity results are shown in table 2.

TABLE 2

Normalized image intensity of Example 2

|   | 1 | 2 | 3 | 4 | 5 | 6 |
|---|---|---|---|---|---|---|
| A | 0.65 | 0.75 | 0.85 | 0.75 | 0.85 | 0.75 |
| B | 0.7 | 0.75 | 1 | 0.85 | 1 | 0.75 |
| C | 0.75 | 0.85 | 0.9 | In-coupling | 0.9 | 0.85 |
| D | 0.7 | 0.8 | 1 | 0.8 | 1 | 0.8 |
| E | 0.65 | 0.75 | 0.85 | 0.7 | 0.85 | 0.75 |

Example 3

As shown in FIGS. 1 and 2, the planar optical waveguide based on the two-dimensional grating of this example of the present invention includes an optical waveguide substrate 1 and a functional grating element 2.

In this example, the optical waveguide substrate 1 is a plane-parallel glass plate with top surface 102 and bottom surface 103 being in parallel with each other. The thickness of the substrate is 0.5 mm. The refractive index of the substrate is 1.5.

A two-dimensional grating, which comprises a plurality of grating members 201 embodied as cylindrical columns, with an angle of 60° between the two grating directions, a period T of 360 nm, and a column diameter R of 100 nm, is formed on the surface of the plane-parallel glass plate (optical waveguide substrate 1) to work as the functional structure.

The intensity of light propagating inside the optical waveguide gradually decreases along with continuous out-coupling by the two-dimensional grating, and thus the brightness of the output image gradually decreases along the direction of exit pupil expansion if the grating structure is non-variant. In order to solve the above problem, the column depths of the plurality of grating members 201 of the two-dimensional grating in different areas are controlled and modulated so that the brightness of the output image across the grating area is relatively uniform. More specifically, the optical waveguide is divided into 30 areas with A to E along the vertical direction and 1 to 6 along the horizontal direction, in which gratings are manufactured with column depths shown in table 3.

TABLE 3

Column depths of two-dimensional gratings of Example 3

|   | 1 | 2 | 3 | 4 | 5 | 6 |
|---|---|---|---|---|---|---|
| A | 250 nm | 200 nm | 170 nm | 140 nm | 120 nm | 140 nm |
| B | 200 nm | 170 nm | 140 nm | 120 nm | 100 nm | 120 nm |
| C | 200 nm | 170 nm | 140 nm | 120 nm | 250 nm | 120 nm |
| D | 200 nm | 170 nm | 140 nm | 120 nm | 100 nm | 120 nm |
| E | 250 nm | 200 nm | 170 nm | 140 nm | 120 nm | 140 nm |

The image projected out from the micro-projector 3 enters the optical waveguide through C5, and the image intensity is measured in the remaining areas. The normalized intensity results are shown in table 4.

TABLE 4

Normalized image intensity of Example 3

|   | 1 | 2 | 3 | 4 | 5 | 6 |
|---|---|---|---|---|---|---|
| A | 0.85 | 0.88 | 0.95 | 0.96 | 0.7 | 0.96 |
| B | 0.9 | 0.92 | 0.95 | 1 | 0.8 | 1 |
| C | 0.9 | 0.92 | 0.95 | 0.97 | In-coupling | 0.97 |
| D | 0.9 | 0.92 | 0.95 | 1 | 0.8 | 1 |
| E | 0.85 | 0.88 | 0.95 | 0.97 | 0.7 | 0.97 |

Example 4

As shown in FIGS. 1 and 2, the planar optical waveguide based on the two-dimensional grating of this example of the present invention includes an optical waveguide substrate 1 and a functional grating element 2.

In this example, the optical waveguide substrate 1 is a plane-parallel glass plate with top surface 102 and bottom surface 103 being in parallel with each other. The thickness of the substrate is 0.5 mm. The refractive index of the substrate is 1.5.

A two-dimensional grating, which comprises a plurality of grating members 201 embodied as cylindrical columns, with an angle of 60° between the two grating directions, a period T of 360 nm, and depth of 150 nm, is formed on the surface of the plane-parallel glass plate (optical waveguide substrate 1) to work as the functional structure.

The intensity of light propagating inside the optical waveguide gradually decreases along with continuous out-coupling by the two-dimensional grating, and thus the brightness of the output image gradually decreases along the direction of exit pupil expansion if the grating structure is non-variant. In order to solve the above problem, the diameter R of the plurality of grating members 201 of the two-dimensional grating in different areas are controlled and modulated so that the brightness of the output image across the grating area is relatively uniform. More specifically, the optical waveguide is divided into 30 areas with A to E along the vertical direction and 1 to 6 along the horizontal direction, in which gratings are manufactured with column diameters R shown in table 5.

TABLE 5

Column diameters R of two-dimensional gratings of Example 4

|   | 1 | 2 | 3 | 4 | 5 | 6 |
|---|---|---|---|---|---|---|
| A | 260 nm | 240 nm | 210 nm | 170 nm | 130 nm | 170 nm |
| B | 240 nm | 210 nm | 170 nm | 130 nm | 100 nm | 130 nm |
| C | 240 nm | 210 nm | 170 nm | 130 nm | 220 nm | 130 nm |
| D | 240 nm | 210 nm | 170 nm | 130 nm | 100 nm | 130 nm |
| E | 260 nm | 240 nm | 210 nm | 170 nm | 130 nm | 170 nm |

The image projected out from the micro-projector 3 enters the optical waveguide through C5, and the image intensity is measured in the remaining areas. The normalized intensity results are shown in table 6.

TABLE 6

Normalized image intensity of Example 4

|   | 1 | 2 | 3 | 4 | 5 | 6 |
|---|---|---|---|---|---|---|
| A | 0.82 | 0.88 | 0.91 | 0.94 | 0.94 | 0.94 |
| B | 0.88 | 0.91 | 0.95 | 1 | 0.96 | 1 |

TABLE 6-continued

Normalized image intensity of Example 4

|   | 1 | 2 | 3 | 4 | 5 | 6 |
|---|---|---|---|---|---|---|
| C | 0.88 | 0.91 | 0.93 | 0.96 | In-coupling | 0.96 |
| D | 0.88 | 0.91 | 0.93 | 1 | 0.96 | 1 |
| E | 0.82 | 0.88 | 0.91 | 0.94 | 0.94 | 0.94 |

The present invention realizes in-coupling, exit pupil expansion and out-coupling of light through a two-dimensional grating optical waveguide with a fixed period. After light output from the micro-projector 3 passes through any area of the functional grating element 2, it gets diffracted by the two-dimensional grating to produce multiple diffraction orders which enter the optical waveguide substrate 1, and gets out-coupled from the waveguide after various numbers of bounces inside the optical waveguide substrate 1, and as a result, the output image can be seen across the entire area of the functional grating element 2. The invention involves a monolithic structure, which is suitable for mass-production as well as for application adaption.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An augmented reality display, comprising:
a micro-projector for light output; and
a planar optical waveguide configured for transporting the light output from said micro-projector, wherein said planar optical waveguide comprises an optical waveguide substrate which is a transparent plane parallel waveguide, and a functional grating element coupled to said optical waveguide substrate, wherein said functional grating element is a two-dimensional grating having two grating directions having a predetermined angle therebetween, wherein a refractive index of said parallel waveguide is in the range of 1.4-2.2 and a thickness of said parallel waveguide is in the range of 0.3-2.5 mm, wherein said predetermined angle between said grating directions is 60°.

2. An augmented reality display, comprising:
a micro-projector for light output; and
a planar optical waveguide configured for transporting the light output from said micro-projector, wherein said planar optical waveguide comprises an optical waveguide substrate which is a transparent plane parallel waveguide, and a functional grating element coupled to said optical waveguide substrate, wherein said functional grating element is a two-dimensional grating having two grating directions having a predetermined angle therebetween, wherein a refractive index of said parallel waveguide is in the range of 1.4-2.2 and a thickness of said parallel waveguide is in the range of 0.3-2.5 mm, wherein the period of the two-dimensional grating is in the range of 200-700 nm.

3. An augmented reality display, comprising:
a micro-projector for light output; and
a planar optical waveguide configured for transporting the light output from said micro-projector, wherein said planar optical waveguide comprises an optical waveguide substrate which is a transparent plane parallel waveguide, and a functional grating element coupled to said optical waveguide substrate, wherein said functional grating element is a two-dimensional grating having two grating directions having a predetermined angle therebetween, wherein a refractive index of said parallel waveguide is in the range of 1.4-2.2 and a thickness of said parallel waveguide is in the range of 0.3-2.5 mm, wherein said two-dimensional grating comprises a plurality of grating members arranged in an array, wherein each of said plurality of grating members of the two-dimensional grating is a cylindrical column.

4. An augmented reality display, comprising:
a micro-projector for light output; and
a planar optical waveguide configured for transporting the light output from said micro-projector, wherein said planar optical waveguide comprises an optical waveguide substrate which is a transparent plane parallel waveguide, and a functional grating element coupled to said optical waveguide substrate, wherein said functional grating element is a two-dimensional grating having two grating directions having a predetermined angle therebetween, wherein a refractive index of said parallel waveguide is in the range of 1.4-2.2 and a thickness of said parallel waveguide is in the range of 0.3-2.5 mm, wherein said two-dimensional grating comprises a plurality of grating members arranged in an array, wherein each of said plurality of grating members of the two-dimensional grating is a diamond column, wherein the bottom cross section of said diamond column has a diamond shape.

5. The augmented reality display, as recited in claim 3, wherein the diameter of said cylindrical column of each of said plurality of grating members of said two-dimensional grating is in the range of 50-650 nm, and the height thereof is in the range of 80-650 nm.

6. The augmented reality display, as recited in claim 4, wherein the side length of said diamond column of each of said plurality of grating members of said two-dimensional grating is in the range of 50-650 nm, and the height thereof is in the range of 80-650 nm.

7. An augmented reality display, comprising:
a micro-projector for light output; and
a planar optical waveguide configured for transporting the light output from said micro-projector, wherein said planar optical waveguide comprises an optical waveguide substrate which is a transparent plane parallel waveguide, and a functional grating element coupled to said optical waveguide substrate, wherein said functional grating element is a two-dimensional grating having two grating directions having a predetermined angle therebetween, wherein a refractive index of said parallel waveguide is in the range of 1.4-2.2 and a thickness of said parallel waveguide is in the range of 0.3-2.5 mm, wherein said two-dimensional grating comprises one or more grating members and each of said one or more grating members is a cylindrical column, wherein the diameter of each cylindrical column is in the range of 200-650 nm, and the height thereof is in the range of 200-650 nm.

8. An augmented reality display, comprising:

a micro-projector for light output; and a planar optical waveguide configured for transporting the light output from said micro-projector, wherein said planar optical waveguide comprises an optical waveguide substrate which is a transparent plane parallel waveguide, and a functional grating element coupled to said optical waveguide substrate, wherein said functional grating element is a two-dimensional grating having two grating directions having a predetermined angle therebetween, wherein a refractive index of said parallel waveguide is in the range of 1.4-2.2 and a thickness of said parallel waveguide is in the range of 0.3-2.5 mm, wherein said two-dimensional grating comprises one or more grating members and each of said one or more grating members is a diamond column, wherein the bottom cross section of said diamond column has a diamond shape, wherein the side length of each diamond column at said in-coupling position is in the range of 200-650 nm, and the height thereof is in the range of 200-650 nm.

\* \* \* \* \*